March 9, 1965 E. SIRTL 3,172,857
METHOD FOR PRODUCING HOMOGENEOUSLY DOPED MONOCRYSTALLINE
BODIES OF ELEMENTAL SEMICONDUCTORS
Filed June 9, 1961
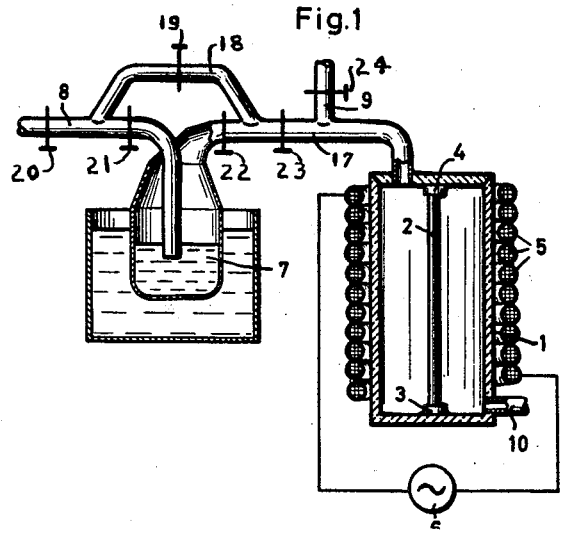
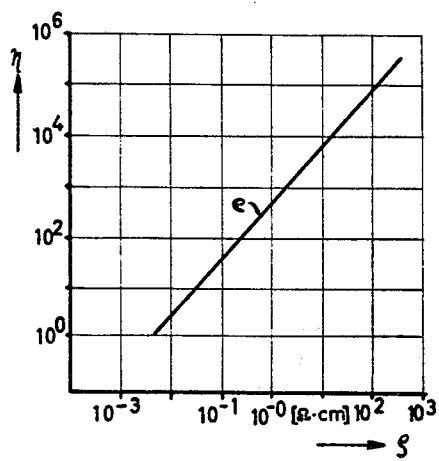
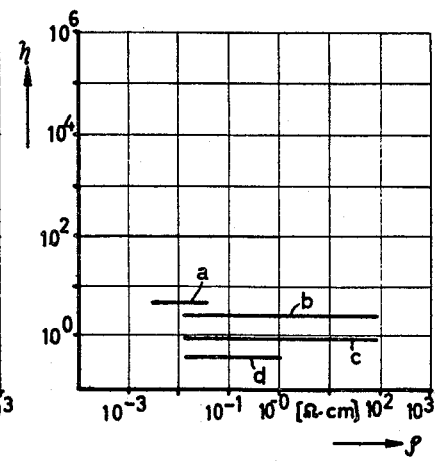

United States Patent Office 3,172,857
Patented Mar. 9, 1965

3,172,857
METHOD FOR PRODUCING HOMOGENEOUSLY DOPED MONOCRYSTALLINE BODIES OF ELEMENTAL SEMICONDUCTORS
Erhard Sirtl, Munich, Germany, assignor to Siemens & Halske Aktiengesellschaft, Berlin and Munich, Germany, a German corporation
Filed June 9, 1961, Ser. No. 116,042
Claims priority, application Germany, June 14, 1960, S 68,933
4 Claims. (Cl. 252—62.3)

My invention relates to the pyrolytic production of semiconducting elements by pyrolytic, i.e. thermal or electro-thermal, conversion of a reaction gas which contains a halogen compound of the particular semiconductor element preferably in mixture with hydrogen.

It is known to add to the reaction gas a gaseous compound of doping substances for obtaining correspondingly doped semiconductor bodies. Such pyrolytic methods are described for example in Bischoff application Serial No. 87,885, filed November 8, 1961, assigned to the assignee of the present invention. These methods afford the production of rods consisting of the elemental semiconductor material. By corresponding purification of the individual gaseous components, particularly by means of partial hydrolysis, the purity of the rods can be given such a high degree that the rod is directly suitable for further fabrication into semiconductor devices or components without necessitating further purification. Nevertheless, it has been customary to subject the pyrolytically produced rods to crucible-free (floating) zone melting for converting them to monocrystalline condition. In principle, monocrystalline rods can also be obtained directly from the pyrolytic precipitation methods when using a monocrystalline carrier or core rod as the starting material. However, in practice, the resulting products are imperfect due to occurrence of lattice disturbances.

According to an earlier disclosure (U.S. application of E. Sirtl, Serial No. 81,607, filed January 9, 1961) the pyrolytic method can be modified to more reliably obtain monocrystalline silicon rods without employing a zone-melting process. This method also involves the above-mentioned pyrolytic principle. That is, monocrystalline silicon is produced by passing a current of reaction gas, consisting of a halogen-containing silicon compound, preferably a halogen silane in mixture with purified hydrogen, over a monocrystalline carrier body of pure or doped silicon which is mounted in the reaction vessel and is electrically heated to the pyrolytic temperature so that silicon is liberated from the reaction gas and precipitated upon the heated carrier to effect a monocrystalline growth which increases the thickness of the carrier. To promote such monocrystalline growth, the reaction gas is given from the outset an admixture of another halogen compound, preferably a halogen hydrogen compound, which displaces the reaction equilibrium in favor of the bonded silicon, this added compound being preferably formed during the course of the pyrolytic conversion process. The admixture is given such a proportion that the chemical equilibrium temperature $T_0$ of the gases participating in the reaction is at most 200° C. below the chosen pyrolytic precipitation temperature $T$, and the segregation and precipitation of silicon is completely prevented below the equilibrium temperature $T_0$.

This method affords the production of monocrystalline silicon on germanium rods by precipitation from the gaseous phase without additional zone melting with a degree of purity satisfying the exacting requirements of electronic semiconductor techniques. This raises the further problem of pyrolytically producing such rods from the gaseous phase with a predetermined and homogeneously distributed amount of lattice deflections so as to obtain an accurately defined n-type or p-type dope concentration. The known methods aiming at such results proceed by admixing to the reaction gas, upon production of this gas but prior to introducing it into the pyrolytic reaction process, an amount of doping substance in gaseous condition and in most cases in form of a compound. Such a method, however, is difficult to perform because it requires an exact adaptation of the flow velocity of the reaction gas proper and of the doping gas, as well as an exact adjustment and constancy of the temperatures at which the production of the reaction gas proper and of the doping gas takes place. Even if these conditions are accurately met, it cannot be reliably achieved that in the reaction vessel used for pyrolytic precipitation the ratio of doping substance to the silicon or germanium remains constant with the required precision.

It is, therefore, an object of my invention to devise a pyrolytic semiconductor production method generally of the above-mentioned type that affords the production of monocrystalline semiconductor bodies in a more reliable and relatively simple manner, thus securing a high degree of purity as well as a homogeneous doping required for electronic purposes.

To this end, and in accordance with a feature of my invention, I produce the mixture of semiconductor compound and doping substance present in the pyrolytic reaction gas, exclusively by evaporating in an evaporator vessel a liquid mixture consisting of a purified semiconductor-halogen compound and a purified halogen compound of the same doping substance as is present in the heated carrier body upon which the semiconductor element is to be precipitated, the boiling point of the liquid dope-halogen compound being approximately the same as that of the liquid semiconductor-halogen compound, i.e. departing therefrom only up to about 50° C. I further rate the proportions of the liquid mixture so that the quantities of semiconductor substance and doping substance that are being precipitated upon the heated carrier at the pyrolytic reaction temperature being used, continuously possess the same ratio as in the carrier body.

By virtue of the condition that the halogenide of the doping substance and the halogenide of the semiconductor element have respective boiling temperatures close to each other, i.e. differing by at most 50° C., the vapor above the mixture in the evaporator vessel contains a constant ratio of semiconductor atoms to atoms of the doping substance, as long as the mixture is in liquid condition and the flow velocity of the carrier gas, i.e. the admixed hydrogen, does not drop below a small minimum value. That is, the flow velocity of the carrier gas which removes the gaseous mixture of semiconductor and doping atoms from the evaporator must be higher than approximately 10 liters per hour. The simple silicon or germanium compounds of halogen usually employed for the pyrolytic production of silicon or germanium, for example $SiCl_4$, $SiHCl_3$ or $GeCl_4$, $GeHCl_3$, already sufficiently evaporate at normal room temperature (20° C.) The same applies to a number of chlorides or bromides of the usually employed doping substances, for example $PCl_3$, $AsCl_3$, $BBr_3$.

Experience has shown that as long as temperature fluctuations in the evaporator vessel remain within the approximate range of ±3° C., the proportion of the doping atoms to semiconductor atoms in the vapor space is not appreciably changed. Therefore no expedients are necessary for strictly maintaining constancy of temperature in the evaporator vessel.

The vapor evolving in the evaporator vessel is passed directly into the reaction vessel in which the production of the semiconductor is to take place. This is preferably done with the aid of a current of purified hydrogen gas which is introduced into the evaporator vessel, becomes laden with the vapor of the semiconductor-halogen compound and the halogen compound of the doping substance, and which, in this condition, is supplied to the pyrolytic reaction vessel. It is preferable to keep the reaction gas, after it leaves the evaporator vessel, continuously at a higher temperature then obtaining in the evaporator vessel.

Since in the reaction gas the proportion of semi-conductor atoms and doping atoms remains constant when produced according to the invention, a homogeneous doping of the resulting solid semiconductor body is secured even with any desired long duration of the precipitation process, provided the precipitation temperature remains substantially constant. Changes in doping are then possible only by changing the corresponding composition of the liquid in the evaporator vessel.

If the dope concentration of the semiconductor substance being precipitated upon the carrier is to be identical with that of the carrier, the composition of the liquid mixture in the evaporator vessel must be so adjusted that the ratio of the doping atoms precipitating in elemental condition to the simultaneously precipitating semiconductor atoms, is the same as the corresponding ratio in the carrier. This can be done by preparing standard solutions of respectively different composition from the semiconductor-halogen compound and the dope-halogen compound to be used in the precipitation process, and by then determining the ratio of the doping atoms and semiconductor atoms simultaneously precipitated from a reaction gas produced from the standard solutions at the intended pyrolytic temperature of the heated carrier. This ratio can be determined, for example, by measuring the electric conductivity of the semiconductor products. A carrier body of hyperpure dope-free silicon or germanium can be used for these preliminary tests.

As mentioned, as long as the temperature of the conversion process is kept constant, particularly when the temperature of the carrier is maintained at the value intended for the pyrolytic precipitation, the ratio of precipitated semiconductor atoms to simultaneously precipitated dope atoms changes only in dependence upon a change in composition of the mixture contained in the evaporator vessel. Consequently, the use of the above-mentioned different standard solutions results in imparting different dope concentrations to the respective solid semiconductor specimens produced at the particular pyrolytic temperature. The results thus obtained may serve for plotting a calibrating curve which, once prepared, affords predetermining the composition of the halogenide mixture required in the evaporator for pyrolytic precipitation of semiconductor substance of predetermined doping such as the same doping as contained in the carrier. The standard solutions for preparing the calibrating curve can readily be produced, for example, from chlorsilane and a liquid halogenide of a doping substance, and can be stored without change in composition for prolonged periods of time in a vessel sealed from the ambient atmosphere, for example, in vessels closed and sealed by means of tetrafluoroethylene resin, as available in the trade under the name Teflon.

As a rule the concentration ratio of the doping substance in the carrier is known beforehand if these carriers are produced by the same manufacturer who employs the pyrolytic precipitation process according to the present invention.

A homogeneously doped, thin wire-like or rod-shaped carrier can be produced for example by first pulling a relatively thick crystal rod from a homogeneously doped melt at constant pulling speed, and thereafter thinning the rod by subjecting it to zone melting and simultaneously moving the rod-end holders axially away from one another at constant speed, thus reducing the cross section of the re-solidifying material and hence of the resulting product. This thinning method is in accordance with the copending application of Reimer Emeis, Serial No. 409,610, filed February 11, 1954, now Patent No 3,030,194.

When using, in the process according to my invention, a carrier of unknown composition, it is first necessary to analyze the carrier in order to determine its dope concentration and kind of a doping substance.

The process according to the invention is also applicable in conjunction with the process of producing monocrystalline silicon described in the above-mentioned copending application Serial No. 81,607. According to that method, the pyrolytic reaction gas is given an addition of substance which shifts the reaction equilibrium in favor of the bonded silicon. Suitable as addition substances are HCl or HBr, depending upon whether the gaseous semiconductor compound is a chloride or bromide. If the additional substance is liquid at normal room temperature (20° C.), it is advisable to add it from the outset in the required amount to the liquid mixture of semiconductor-halogen compound and dope-halogen compound entered into the evaporator vessel. Gaseous addition substances to be used in accordance with the method of the application Serial No. 81,607, such as HCl, can be added to the reaction gas in the proper quantities. In this case, too, a calibrating curve can be prepared by pre-testing with the aid of standard solutions of respectively different composition. The calibrating curve can then be used to indicate the required composition of the mixture to be introduced into the evaporator vessel in accordance with varying operating conditions and the desired composition of the substances that are being precipitated upon the carrier and are to have the same composition as the corresponding substances within the carrier. This prevents any effect of the addition substances upon the doping content of the precipitation product.

As mentioned, the ratio of doping atoms and semiconductor atoms in the monocrystalline silicon or germanium body pyrolytically produced in accordance with the invention does not noticeably vary as long as the pyrolytic precipitation temperature, that is the temperature of the heated carrier body, is kept substantially constant. The pyrolytic temperature for the production of silicon, for example, is usually between 900 and 1400° C. It has been found that generally no change in the above-mentioned ratio is observed if the precipitation temperature varies within the limits of a few degrees, namely within about ±10° C., from the selected datum value. Greater variations of this temperature also remain ineffective with respect to the above-mentioned ratio if, within the temperature range of such variation, the function $q(T)$, indicating the dependence of the precipitation speed (rate of precipitation) upon the temperature (T), differs at most about 10% from the value of its first (differential) derivation.

At the pyrolytic processing temperatures usually employed and with some liquid mixtures of semiconductor-halogen compound and dope-halogen compound, the ratio of the semiconductor atoms to the simultaneously precipitated doping atoms corresponds to about the molar ratio at which the halogenides of the two substances are present in the gaseous mixture within the evaporator vessel. This applies, for example, to mixtures of the composition $PCl_3/SiHCl_3$, $PCl_3/SiCl_4$ or $POCl_3/SiCl_4$. With other mixtures, however, considerable departures may occur. An example thereof is the element boron relative to which the insertion of boron atoms into the solid semiconductor body greatly depends upon the concentration of the boron-halogen compound in the semiconductor-halogen compound. When adding slight quantities of boron-halogen compounds, the starting material must be kept substantially free of phosphorus and arsenic because otherwise an appreciable counter-doping by such substances may occur due to retarded boron precipitation.

The following way has been found most preferable for producing a silicon carrier body of a desired homogeneous dope distribution to be employed as starting material in the pyrolytic method according to the invention. The production of the carrier rod is started from a silicon core rod of a known doping degree. This rod is subjected to crucible-free zone levelling, and the donor or acceptor substance required for obtaining the desired specific ohmic resistance is added to the molten zone during zone levelling. Such zone levelling—known for example from the book by Hannay, Semiconductors, Reinhold Publishing Corporation, New York, 1951, pages 178–180—is performed with the floating zone passing alternately in both directions along the rod to thereby distribute the doping substance and homogenize the rod. When the desired specific resistance of the silicon rod and hence the corresponding dope concentration is attained, the rod is subjected to thinning in another crucible-free zone-melting operation during which the rod ends are pulled apart so that the molten zone and thereby the cross section of the recrystallizing material is reduced to the smaller size desired in the carrier subsequently to be employed for pyrolytic precipitation.

The zone-melting processes required for zone refining and zone levelling render the production of such a carrier rather expensive, particularly since the many passes of zone-melting operation cause appreciable quantities of doping substance to evaporate from the molten zone so that replenishment is necessary. Therefore, the processing just described is advisable only if a carrier of the desired homogeneous doping is to be produced for the first time. Since the method of the invention readily permits producing a homogeneously doped rod of any desired cross section whose doping degree exactly corresponds to that of the original carrier without requiring further zone-melting processes, such a rod can thereafter be given the desired length simply by a corresponding thin-drawing operation which requires only a few zone-melting passes. The length of the thinned rod then is a multiple of that of the original rod. Consequently, the thinned rod, generally, can be divided into several homogeneous carriers for subsequent performance of the pyrolytic process of the invention. The number of zone passes required for thinning the rod, generally at most three, is too small to permit appreciable evaporation of doping substance. For that reason, the amount of work and expenditure involved in the production of further carriers is negligible in comparison with the above-described production of the original carrier.

The products made by the method of the invention have such a perfectly homogeneous doping that the pyrolytically precipitated material has the same properties as the material of the original carrier. This is of decisive significance for securing uniform electric properties in the silicon wafers or other bodies made from such a rod for further fabrication into electronic semiconductor devices.

For performing the precipitation process according to the invention, a carrier made in the above-described manner and thus having an accurately determined and uniformly distributed dope content, is inserted into the pyrolytic apparatus, such as the ones schematically illustrated in FIG. 1 of the accompanying drawings in which FIGS. 2 and 3 are respective explanatory graphs relating to the process performed with the aid of the same apparatus.

The pyrolytic reaction vessel 1 shown in FIG. 1 consists of quartz. The above-mentioned carrier rod 2 is vertically mounted in the cylindrical reaction vessel between holders 3 and 4 likewise consisting of quartz. Prior to inserting the carrier 2, the reaction vessel is to be carefully cleaned. During operation, the vessel is surrounded by an induction coil 5 electrically connected with a high-frequency current source 6. During performance of the process, the rod 2 is inductively heated over its entire length to the required pyrolytic precipitation temperature, with the exception of the holders 3 and 4 which, if desired, may be cooled. The pyrolytic temperature must be below the melting point of silicon, but must be high enough to cause precipitation of silicon onto the surface of the carrier from a reaction gas which passes through the processing vessel in contact with the surface of the carrier. As long as the temperature of the carrier is kept between 900° C. and the melting point of silicon, the desired precipitation of silicon is secured, using a reaction gas consisting of a mixture of hydrogen with a silicon-halogen compound, for example $SiHCl_3$ or $SiCl_4$.

Since the rod 2 does not appreciably conduct when cold, the inductive heating is applied after pre-heating the rod up to incandescent temperature. This can be done, for example, by heat radiation from the outside before the inductance coil 5 is placed over the processing vessel.

The reaction gas is produced in an evaporator 7 mounted in a tempering bath 16. The evaporator is filled with a mixture of liquid $SiHCl_3$ or $SiCl_4$, and with a doping compound that is liquid at normal room temperature, for example $PCl_3$ or $PCl_5$. The evaporator vessel 7 is supplied through a conduit 8 with highly purified hydrogen which passes through the liquid mixture in the evaporator 7 and becomes laden with the vapors evolving from the liquid silicon compound and the liquid doping compound. The gaseous mixture is supplied to the processing vessel 1. The spent waste gases leave the processing vessel 1 through an outlet 10. The gas conduit 17 between the evaporator 7 and the processing vessel 1 is provided with a branch line 9 for additional supply of dry hydrogen-chloride (HCl) gas for improving the crystalline precipitation. A by-pass conduit 18 also permits passing hydrogen from conduit 8 into the processing vessel 1 without charging this amount of hydrogen with compounds from the evaporator 7. The by-pass conduit 18 also serves for adjusting the molar ratio $H_2/SiCl_4$ or $SiHCl_3$ required for the monocrystalline precipitation of silicon. The abovementioned conduits are provided with valves denoted by 19 to 24.

For initiating the pyrolytic process, it is preferable to first open the valve 19 in branch line 18 and to close the valves 21, 22 and 24, thus passing dry hydrogen from conduit 8 through the processing vessel 1 for a sufficiently long period of time to remove any traces of humidity from the processing vessel. It is also advantageous to make the induction coil 5 readily removable and replaceable by an electric furnace or radiation heater which is used during the starting-up period for removing humidity from the processing system and pre-heating the carrier rod 2. Thereafter, the induction coil 5 is applied for keeping the rod glowing in pure hydrogen before commencing the precipitation process proper.

This process is then started by closing the valve 19 and opening the valves 21 and 22, thus passing the above-described gaseous reaction mixture into and through the processing vessel.

Relative to the composition of the liquid silicon compound, for example $SiHCl_3$ or $SiCl_4$, and the doping compound, for example $PCl_3$, $PCl_5$ or $BCl_3$, this mixture being liquid at room temperature and filled into the evaporator 7, the following expedients are applicable.

If, for example, silicochloroform ($SiHCl_3$) is used as the reaction compound, and the carrier 2 at normal room temperature has a specific resistance of 10 ohm-cm. and is doped only with phosphorus, then the reaction compound must be given an admixture of a phosphorus compound that is liquid at normal room temperature, elemental phosphorus not being applicable for this purpose. Particularly suitable as such an admixture to silicochloroform is phosphorus trichloride, $PCl_3$. It is therefore necessary to determine for $SiHCl_3$ and $PCl_3$ the particular ratio $c_P:c_{Si}$ in the liquid mixture which, when evaporated, furnishes the reaction gas needed to accurately produce a specific resistance of 10 ohm-cm. in the silicon precipitating at the particular processing temperature to which the carrier is adjusted. In the ratio $c_P:c_{Si}$, the value $c_P$ denotes the concentration of phosphorus atoms in the evaporator gas mixture, and $c_{Si}$ the concentration of the silicon atoms. These values are readily ascertained in the conventional manner from the mole percentages of $SiHCl_3$ (or $SiCl_4$) and $PCl_3$. The same applies to determining the necessary mixing ratio of $SiHCl_3$ (or $SiCl_4$) and $PCl_3$ required for obtaining a desired ratio $c_P:c_{Si}$. The compound $PCl_3$ has the essential property that its boiling point is close to that of $SiHCl_3$ or $SiCl_4$ so that in the vapor above the liquid in the evaporator there obtains virtually the same ratio $c_P:c_{Si}$ as in the unevaporated liquid. This ratio is substantially independent of the temperature (0–20° C.) to which the evaporator 7 is adjusted with the aid of the temperature-control bath 16, as long as the gas-flow velocity is relatively high (above 10 liters per hour). The same applies to a number of other doping compounds for example $BCl_3$, $BBr_3$ or $AsCl_3$. Thus, a definite relation is established between the concentration ratio $c_P:c_{Si}$ of the liquid mixture in the evaporator on the one hand, and the specific resistance of the silicon precipitating upon the carrier 2 in the processing vessel 1 for a given temperature of the carrier, on the other hand. This is an essential prerequisite for successfully performing the method according to the invention.

The just-mentioned relation between concentration ratio and specific resistance is graphically represented by calibrating curves in FIGS. 2 and 3.

Such calibrating curves are obtained in the above-described manner by preparing a number of different standard solutions containing, for example, $10^{-8}$, $10^{-6}$, and $10^{-4}$ molecules of $PCl_3$ per molecule of silicon-halogen compound. This, when using $SiHCl_3$ and $PCl_3$, corresponds to a volumetric graduation of $8.6 \cdot 10^{-9}$, $8.6 \cdot 10^{-7}$ and $8.6 \cdot 10^{-5}$. A different reaction gas is produced from each of these respective standard solutions in the manner already described, and each reaction gas is then employed in the pyrolytic processing apparatus for the production of elemental silicon. Since the respective reaction gases, corresponding to the different contents of the $PCl_3$ standard solutions employed, possess respectively different contents of phosphorus atoms, the specific resistance values of the silicon precipitated from the respective gases are different. By plotting these resistance values versus the ratio $c_P:c_{Si}$ and interconnecting the measuring points, the resulting curve is indicative of the law of dependency for a given parameter value constituted by the precipitation temperature at the carrier surface. The curve therefore can be used as a calibrating curve for the precipitation temperature to be employed. It has been found that when using boron chloride ($BCl_3$) or phosphorus chlorides ($PCl_3$ and $PCl_5$), the precipitation of the doping substance is only slightly dependent upon the carrier temperature.

In order to more clearly represent the relation between the ratio $c_P:c_{Si}$ of the liquid mixture in the evaporator and the specific resistance $\rho$ of the precipitated silicon, it is advisable to indicate on the ordinate of the diagram the ratio $\eta$ of the molar phosphorus concentration in the liquid mixture to the atomic phosphorus concentration in the precipitated silicon, and to indicate the resulting specific resistance $\rho$ of the precipitated silicon on the abscissa. This is done in the two diagrams shown in FIGS. 2 and 3.

In FIG. 3 the curves $a$, $b$, $c$ and $d$, extending substantially parallel to the abscissa, represent the dependence to be determined of the phosphorus concentration available in the evaporator upon the phosphorus concentration in the precipitated silicon. More specifically, curve $a$ relates to the precipitation of phosphorus if $PCl_5$ and $SiCl_4$ are used in the liquid mixture within the evaporator. Curve $b$ relates to the use of $PCl_3$ and $SiHCl_3$, curve $c$ to the use of $PCl_3$ and $SiCl_4$, curve $d$ to the use of $POCl_3$ and $SiCl_4$. Those curves apply to a carrier temperature of 1000–1400° C.

The calibrating curves (FIG. 3) are used in the following manner. If the carrier, doped only with phosphorus, has a specific resistance of 10 ohm-cm., and if the resistance of the precipitated silicon is to have the same value, then, in accordance with general knowledge, a ration of $5 \cdot 10^{14}$ phosphorus atoms per cm.³ silicon, i.e. $10^{-8}$ phosphorus atoms per silicon atom are required. It is apparent from the diagram of FIG. 3 that for obtaining a specific resistance of .10 ohm cm. (the resistance values relate to 20° C.) a ration of $\eta=0.9$ must be taken into account when using $PCl_3$ and $SiCl_4$ (curve $c$). Since, on the other hand, the phosphorus content per cm.³ silicon for obtaining the specific resistance of 10 ohm-cm. is known as amounting to $5 \cdot 10^{14}$ phosphorus atoms per cm.³ silicon, the reaction gas, according to the definition of $\eta$, and hence the liquid accommodated in the evaporator and consisting of $PCl_3$ and $SiCl_4$, must contain approximately $44.5 \cdot 10^{14}$ phosphorus atoms. This is satisfied by using $4.5 \cdot 10^{-8}$ volumetric parts of $PCl_3$ to one part of $SiCl_4$.

In a mixture of $PCl_3$ and $SiHCl_3$ is to be used, then curve $b$ in FIG. 3 shows that the required value $\eta$ for obtaining the specific resistance of 10 ohm-cm. is $\eta=2$. Hence, for obtaining $5 \cdot 10^{14}$ phosphorus atoms per cm.³ silicon, a ratio of $10 \cdot 10^{14}$ phosphorus atoms per cm.³ in the liquid mixture of $PCl_3$ and $SiHCl_3$ is required in the evaporator.

Other doping substances, for example boron, may show a fundamentally different behavior. As to boron, this is mainly due to the fact that a chemical equilibrium will adjust itself in the gaseous phase between the boron atoms and the silicon atoms. The anomalous behavior of boron is apparent from the diagram of FIG. 2. For obtaining the illustrated calibrating curve $e$, respectively different compositions of $SiCl_4$ and $BCl_3$, or $SiHCl_3$ and $BCl_3$ or $BBr_3$ are to be used. The abscissa in FIG. 3 indicates the specific resistance $\rho$ of the precipitated silicon. The ordinate indicates the ratio $\eta$ of molar boron concentration in the liquid mixture filled into the evaporator relative to the atomic boron concentration in the silicon precipitated from the reaction gas resulting from the liquid mixture.

It is apparent in this case that, for obtaining a higher specific resistance, the value of ratio $\eta$ must be higher than when a lower resistance is desired. For example, when the silicon to be precipitated is to have a specific resistance of $10^{-2}$ ohm-cm. and is doped with boron, the corresponding ratio $\eta$ is about 2.7 according to FIG. 2. Since, on the other hand, obtaining this specific resistance requires $1.2 \cdot 10^{-4}$ boron atoms per cm.³ silicon, the liquid mixture in the evaporator must contain $1.0 \cdot 10^{-4}$ cm.³ $BBr_3$ per cm.³ $SiCl_4$, for example.

If a specific resistance of 10 ohm-cm. is required, then the ratio $\eta$ is found from the calibrating curve $e$ in FIG. 2 to be approximately $6.5 \cdot 10^3$, whereas the boron concentration per cm.³ of precipitated silicon must amount to $3.6 \cdot 10^{-3}$. Consequently, in this case the liquid mixture in the evaporator must contain $3.0 \cdot 10^{-3}$ cm.³ $BBr_3$ per cm.³ $SiCl_4$.

I claim:

1. In the process of producing electronically pure and homogeneously doped, elemental semiconductor bodies selected from the group consisting of silicon and germanium by pyrolytically precipitating the semiconductor material onto a heated carrier from a gaseous atmosphere containing a reaction gas mixture, the steps of employing a monocrystalline carrier and maintaining said carrier at a substantially constant pyrolytic temperature, said carrier consisting of the same semiconductor element as the one to be precipitated and being homogeneously doped with the same doping element as the one to be precipitated; producing said reaction gas mixture exclusively by evaporating a liquid mixture of a pure liquid semiconductor-halogen compound and a pure liquid dope-halogen compound having a boiling point within 50° C. of the boiling point of said semiconductor-halogen compound by passing hydrogen through the liquid mixture at a flow rate of at least 10 liters per hour, the dope element in said dope-halogen compound being identical with the dope element contained in said carrier, the ratio of said two halogen compounds in said liquid mixture corresponding at said given temperature to a precipitation ratio equal to the semiconductor-to-dope ratio in the carrier body, whereby the resulting grown semiconductor body has throughout a predetermined homogeneous composition and dope concentration.

2. In the process of producing electronically pure and homogeneously doped, elemental semiconductor bodies, selected from the group consisting of silicon and germanium, by pyrolytically precipitating the semiconductor material onto a heated carrier from a gaseous atmosphere containing a reaction gas mixture, the steps of employing a monocrystalline carrier and maintaining said carrier at a substantially constant pyrolytic temperature, said carrier consisting of the same semiconductor element as the one to be precipitated and being homogeneously doped with the same doping element as the one to be precipitated; producing said reaction gas mixture exclusively by evaporating a liquid mixture of a pure liquid semiconductor-chlorine compound and a pure liquid dope-chlorine compound having a boiling point within about 50° C. of the boiling point of said semiconductor-chlorine compound by passing hydrogen through the liquid mixture at a flow rate of at least 10 liters per hour, the dope element in said dope-chlorine compound being identical with the dope element contained in said carrier, the ratio of said semiconductor-chlorine compound and said dope-chlorine compound in said liquid mixture corresponding at said given temperature to a precipitation ratio equal to the semiconductor-to-dope ratio in the carrier body, whereby the resulting grown semiconductor body has throughout a predetermined homogeneous composition and dope concentration.

3. In the process of producing electronically pure and homogeneously doped, silicon semiconductor bodies by pyrolytically precipitating the semiconductor materials onto a heated carrier from a gaseous atmosphere containing a reaction gas mixture, the steps of employing a monocrystalline silicon carrier and maintaining said silicon carrier at a substantially constant pyrolytic temperature between 900° and 1400° C., said silicon carrier being homogeneously doped with the same doping element as the one to be precipitated; producing said reaction gas mixture exclusively by evaporating a chlorine-containing silicon compound selected from the group consisting of $SiCl_4$ and $SiHCl_3$ and a pure liquid dope-chlorine compound having a boiling point within about 50° C. of the boiling point of said chlorine-containing silicon compound by passing hydrogen through the liquid mixture at a flow rate of at least 10 liters per hour, the dope element in said dope-chlorine compound being identical with the dope element contained in said carrier, the ratio of said chlorine-containing silicon compound and said dope-chlorine compound in said liquid mixture corresponding at said given temperature to a precipitation ratio equal to the semiconductor-to-dope ratio in the carrier body, whereby the resulting grown semiconductor body has throughout a predetermined homogeneous composition and dope concentration.

4. In the process of producing electronically pure and homogeneously doped, germanium semiconductor bodies by pyrolytically precipitating the semiconductor material onto a heated carrier from a gaseous atmosphere containing a reaction gas mixture, the steps of employing a monocrystalline germanium carrier and maintaining said germanium carrier at a substantially constant pyrolytic temperature, said germanium carrier being homogeneously doped with the same doping element as the one to be precipitated; producing said reaction gas mixture exclusively by evaporating a chlorine-containing germanium compound selected from the group consisting of $GeCl_4$ and $GeHCl_3$ and a pure liquid dope-halogen compound having a boiling point within about 50° C. of the boiling point of said chlorine-containing germanium compound by passing hydrogen through the liquid mixture at a flow rate of at least 10 liters per hour, the dope element in said dope-halogen compound being identical with the dope element contained in said carrier, the ratio of said chlorine-containing germanium compound and said dope-halogen compound in said liquid mixture corresponding at said given temperature to a precipitation ratio equal to the semiconductor-to-dope ratio in the carrier body, whereby the resulting grown semiconductor body has throughout a predetermined homogeneous composition and dope concentration.

References Cited in the file of this patent

UNITED STATES PATENTS

| | | |
|---|---|---|
| 2,763,581 | Freedman | Sept. 18, 1956 |
| 2,910,394 | Scott et al. | Oct. 27, 1959 |
| 2,943,918 | Pauls | July 5, 1960 |
| 2,970,111 | Hoffman et al. | Jan. 31, 1961 |
| 2,974,064 | Williams et al. | Mar. 7, 1961 |
| 3,011,877 | Schweickert et al. | Dec. 5, 1961 |